Aug. 20, 1935.     A. M. STONER     2,012,147
CHUCK OPERATING KEY
Filed Nov. 2, 1933
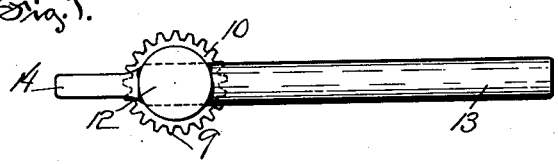
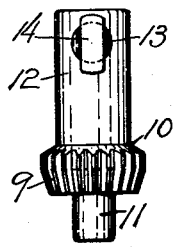
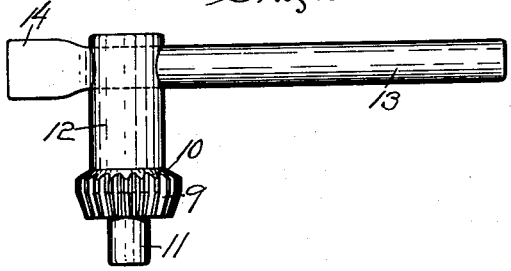
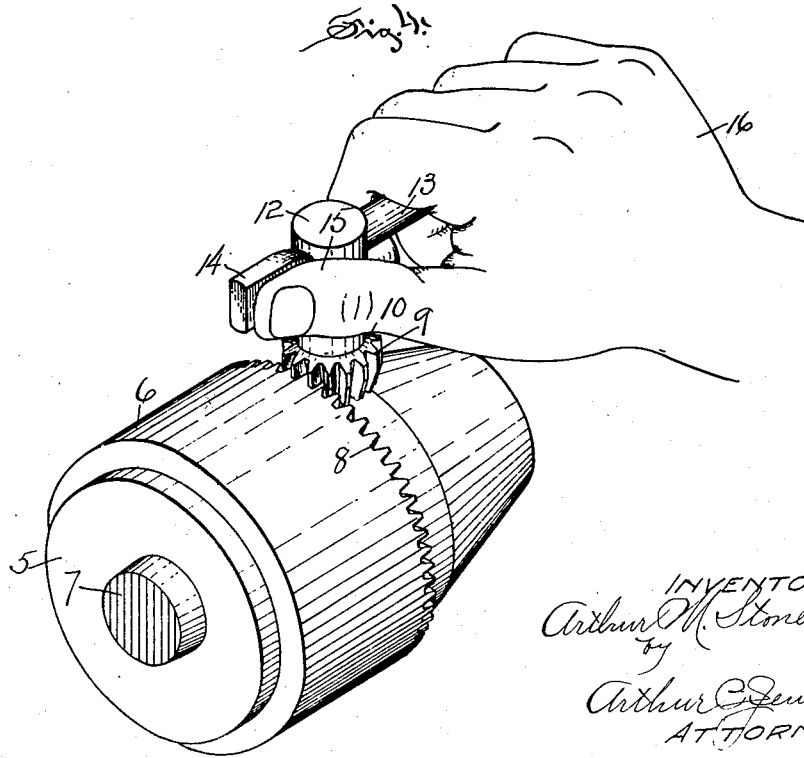
INVENTOR
Arthur M. Stoner,
by
Arthur C. Jenkins,
ATTORNEY Patented Aug. 20, 1935

2,012,147

UNITED STATES PATENT OFFICE 2,012,147

CHUCK OPERATING KEY

Arthur M. Stoner, West Hartford, Conn., assignor to The Jacobs Manufacturing Company, Hartford, Conn., a corporation of Connecticut Application November 2, 1933, Serial No. 696,343

1 Claim. (81—177)

My invention relates more particularly to tools for rotating the sleeve of drill chucks for the purpose of tightening and releasing the chuck jaws, and an object of my invention, among others, is the production of a tool for this purpose in the use of which a greater degree of force may be applied to the sleeve for tightening the chuck jaws than in tools heretofore employed; and a further object of the invention is to provide a tool of this type which while having the advantage just mentioned will also be of a size to enable it to be readily packed with the drill chuck in a package enclosing these devices.

One form of a chuck operating key embodying my invention and in the construction and use of which the objects herein set out, as well as others, may be attained is illustrated in the accompanying drawing, in which—

Figure 1 is a top view of my improved chuck operating key.

Figure 2 is a side view of the same.

Figure 3 is an end view.

Figure 4 is an isometric view of a drill chuck showing the application of my improved key for the purpose of operating the sleeve of said chuck.

A type of drill chuck of ordinary construction comprises a body 5 having a sleeve 6 rotatably mounted thereon, the body having a tapered hole to receive a tapered spindle 7 by means of which the chuck is secured to the spindle. The sleeve 6 is operatively connected with mechanism carried by the body, partially within the sleeve, said mechanism comprising chuck jaws which are closed together and opened for the purpose of gripping or loosening a drill held between said jaws, this operation of the jaws being obtained by rotation of the sleeve 6 in a manner that will be readily understood by those skilled in the art and for which reason a detailed illustration and description are omitted herein.

In this type of drill chuck the sleeve 6 is provided at its lower end with circumferentially arranged teeth 8 which are adapted to engage with teeth 9 on the body 10 of an operating key, this body being in the form of a pinion which has a stud 11 adapted to engage a hole in the chuck body for the purpose of retaining the key in operative position. A stem 12 projects from the key body 10 and this stem, in structures heretofore employed, had a crosswise member or handle extending therethrough to an equal length on opposite sides of the stem.

In the use of this key it is common practice to grasp the handle by locating the stem between the second and third fingers, two fingers therefore being employed on opposite sides of the stem for the purpose of turning the key, the extension of the handle equally on opposite sides of the stem inviting this manner of use.

I have found that if four fingers be employed to grip the handle on one side of the stem a greater amount of force may be applied to the key, particularly if means are provided to receive the thumb of the hand manipulating the key. In the prior devices just referred to, the handle extending equally on opposite sides of the stem, is usually round and this does not encourage the use of the handle by the application of four fingers to the handle on one side of the stem as above described for the reason that the round extension of the handle on the opposite side of the stem sinks into the thumb and causes pain if excessive pressure is applied by the thumb to the handle and the full power of the hand is not therefore utilized.

By the use of my improved chuck operating key herein illustrated and described I have provided means whereby the handle may be grasped on one side of the stem by four fingers, and I have also provided means whereby any amount of power within the strength of the thumb of the hand operating the key may be applied at the opposite side of the stem from the handle thereby utilizing the full power of the hand for the purpose. In constructing my improved tool I provide a handle 13, preferably round, and projecting on one side of the stem 12, and on the opposite side of the stem 12 this handle is flattened to constitute a thumb piece 14 which is of a length just sufficient to receive the thumb 15 of the hand 16 which grasps the tool. It will therefore be readily seen that my improved handle, constructed as just described, enables the key to be grasped with the four fingers on one side of the stem and with a sufficient support for the thumb to enable the latter, in connection with the fingers, to apply a maximum amount of force to the key and hence, through the sleeve, to the chuck jaws for the purpose of enabling the same to exert an extreme pressure upon the shank of a drill.

In the sale of drill chucks a key is commonly supplied with the chuck and in the keys heretofore employed and with the handle extending equally on both sides of the stem a package of objectionable size has been required in order to enable the key to be enclosed within the package. By lessening the length of this handle on one side, as with my improved tool, this projection is removed, and a package of minimum size may be employed to enclose both the drill chuck and the key for operating it.

It will be seen that my improved key comprises a thumb pad located contiguous to the spindle 12, this pad being of a size merely to receive the thumb and therefore the long extension common to keys of this type is eliminated and the hand and thumb therefore cover practically the whole of this part of the tool so that there are no extensions to come in contact with foreign objects and thereby interfere with the use of the tool.

I claim:

A drill chuck key including a stem having means for engagement with a chuck jaw operating member, and a hand grip rigid with one end of the stem and extending laterally thereof, said hand grip including a rod at one side of the stem of a length whereby all fingers of a hand may be engaged therewith and a relatively short widened thumb piece at the other side of the stem in line with the rod.

ARTHUR M. STONER.